(12) United States Patent
Tormen et al.

(10) Patent No.: US 10,132,352 B2
(45) Date of Patent: Nov. 20, 2018

(54) SYSTEM FOR LUBRICATION PIVOT JOINT

(71) Applicant: Caterpillar Global Mining LLC, South Milwaukee, WI (US)

(72) Inventors: Elvis Tormen, Dortmund (DE); Martin Kunigk, Bochum (DE)

(73) Assignee: Caterpillar Global Mining LLC, Tucson, AZ (US)

( * ) Notice: Subject to any disclaimer, the term of this patent is extended or adjusted under 35 U.S.C. 154(b) by 560 days.

(21) Appl. No.: 14/955,044

(22) Filed: Dec. 1, 2015

(65) Prior Publication Data
US 2016/0084297 A1    Mar. 24, 2016

(51) Int. Cl.
*F16C 33/10* (2006.01)
*E02F 9/00* (2006.01)
*F16C 11/04* (2006.01)

(52) U.S. Cl.
CPC .......... *F16C 33/1045* (2013.01); *E02F 9/006* (2013.01); *F16C 11/045* (2013.01); *F16C 2350/26* (2013.01); *Y10T 403/257* (2015.01); *Y10T 403/259* (2015.01); *Y10T 403/32861* (2015.01); *Y10T 403/32918* (2015.01); *Y10T 403/32926* (2015.01)

(58) Field of Classification Search
CPC ............... F16C 33/1045; F16C 11/045; F16C 2350/26; E02F 9/006; Y10T 403/257; Y10T 403/259; Y10T 403/32861; Y10T 403/32918; Y10T 403/32926
See application file for complete search history.

(56) References Cited

U.S. PATENT DOCUMENTS

| | | | | |
|---|---|---|---|---|
| 2,349,898 | A | * | 5/1944 | Bechman ................ B61F 17/26 184/105.3 |
| 2,614,006 | A | * | 10/1952 | Bechman ................ B62D 55/15 305/101 |
| 6,283,667 | B1 | | 9/2001 | Neitzel |
| 7,070,331 | B2 | | 7/2006 | Schaffer et al. |
| 7,748,908 | B2 | * | 7/2010 | Aira ........................ E02F 9/006 384/130 |
| 8,459,894 | B2 | * | 6/2013 | Svensson .............. F16C 11/045 37/466 |
| 2004/0060210 | A1 | | 4/2004 | Nishimura et al. |

(Continued)

FOREIGN PATENT DOCUMENTS

| JP | 8158402 | | 6/1996 |
|---|---|---|---|
| JP | 09184518 | A * | 7/1997 |

(Continued)

*Primary Examiner* — Matthieu F Setliff

(57) ABSTRACT

A system for lubricating a pivot joint including a first bushing and a second bushing and a pin disposed coaxially within a cylinder clevis, the pin having a first groove and a second groove on a first side, and third grooves on a second side and a bore along a length of the pin from first side to the second side. The first groove is used for mounting a seal. The second groove and the third grooves provide transmission of a lubricant to the first bushing and the second bushing respectively. A first cover plate and a second cover plate are fastened to the cylinder clevis using a plurality of fasteners. The first cover plate includes a first port and a second port for providing the lubricant to the first bushing and the second bushing respectively. A spring is provided between the second cover plate and the pin.

1 Claim, 5 Drawing Sheets

(56) References Cited

U.S. PATENT DOCUMENTS

| | | | |
|---|---|---|---|
| 2008/0138005 A1* | 6/2008 | Aira | E02F 9/006 |
| | | | 384/385 |
| 2010/0158601 A1 | 6/2010 | Salas Madrid et al. | |
| 2012/0121319 A1* | 5/2012 | Svensson | F16C 11/045 |
| | | | 403/20 |

FOREIGN PATENT DOCUMENTS

| | | |
|---|---|---|
| JP | 2004286132 | 10/2004 |
| JP | 2006132224 | 5/2006 |
| JP | 2007009598 | 1/2007 |
| JP | 2007263237 | 10/2007 |
| JP | 2014202003 | 10/2014 |
| KR | 655327 | 12/2006 |

* cited by examiner

SYSTEM FOR LUBRICATION PIVOT JOINT

TECHNICAL FIELD

The present disclosure relates to a lubrication of a joint, and more specifically, to a system for lubricating a pivot joint of a cylinder clevis.

BACKGROUND

Heavy machines such as hydraulic excavators, backhoe loaders etc. are employed in various operations, such as mining, or digging operations. These machines have pivot joints between various components of a machine. For example, a pivot joint between a bucket cylinder and a rear wall on face shovel excavators. Typically, these pivot joints are lubricated with either grease or oil.

Currently, lubrication to these pivot joints is provided by one or more grease lines. These grease lines are externally connected through grease ports to a cylinder clevis. As these grease lines are external and, therefore are vulnerable to collisions while a machine is operating. For example, during excavation operations, the grease lines can get damaged due to collisions with excavated boulders. The damage in the grease lines prevents the lubricant to reach the pivot joint, and therefore, leads to a failure of the pivot joint due to overheating caused by metal to metal contact. Typically, for repairing a damaged grease line, the machine has to be stopped from operating, which causes unnecessary downtime of the machines. Moreover, such damage to the grease lines is difficult to spot immediately after it occurs, and thereby, results in the failure of the pivotal joints. Therefore, there is a need for a greasing system that does not get damaged easily while the machine is operating.

Japanese Publication Number 2014202003 discloses a greasing piping of a pin support structure. The reference discloses a cyclic/annular grease supply path formed by a penetration hole, a bush, an inner side hub member, and a lift arm member. The reference further discloses that providing grease to a bucket hinge region, by a grease gun, using a nipple attached at the entrance of a greasing hole. Therefore, the grease arrives at the supply path and spreads round the perimeter of the pin by sliding action of the pin. However, the grease supply arrangement provided in the reference does not provide an even distribution of the grease in a joint which may result in a failure of the joint. Therefore, there is a need for a system having a robust and a proper lubrication of the joint, which is not damaged during normal working conditions of a machine.

SUMMARY OF THE DISCLOSURE

In one aspect of the present disclosure, a system for lubricating a pivot joint of a cylinder clevis is provided. The system includes a first bushing disposed in a first opening at a first end of the cylinder clevis, and a second bushing disposed in a second opening at a second end of the cylinder clevis. The system further includes a pin coupled to the first bushing at the first end and the second bushing at the second end. Each of the pin, the first bushing, and the second bushing is disposed coaxially within the cylinder clevis. The pin having a first side and a second side. The first side having a first groove provided for mounting a seal, and a second groove in fluid communication with the first bushing and provided for transmission of a lubricant. The second side having one or more third grooves in fluid communication with the second bushing and provided for transmission of the lubricant. The pin having a bore extending along a length of the pin from the first side to the second side through the pin and the bore being in fluid communication with the one or more third grooves. The system further includes a first cover plate and a second cover plate, connected to the cylinder clevis through a number of fasteners. The first cover plate having a first port in fluid communication with the second groove and the first bushing and provided to transfer the lubricant to the second bushing. The first cover plate further including a second port in fluid communication with the bore, the one or more third grooves and the second bushing, and provided to transfer the lubricant to the second bushing through the bore and the one or more third grooves. A spring is placed between the second cover plate and the second side of the pin, enabling a contact between the seal and the first cover plate.

Other features and aspects of this disclosure will be apparent from the following description and the accompanying drawings.

DETAILED DESCRIPTION

Figure 1:
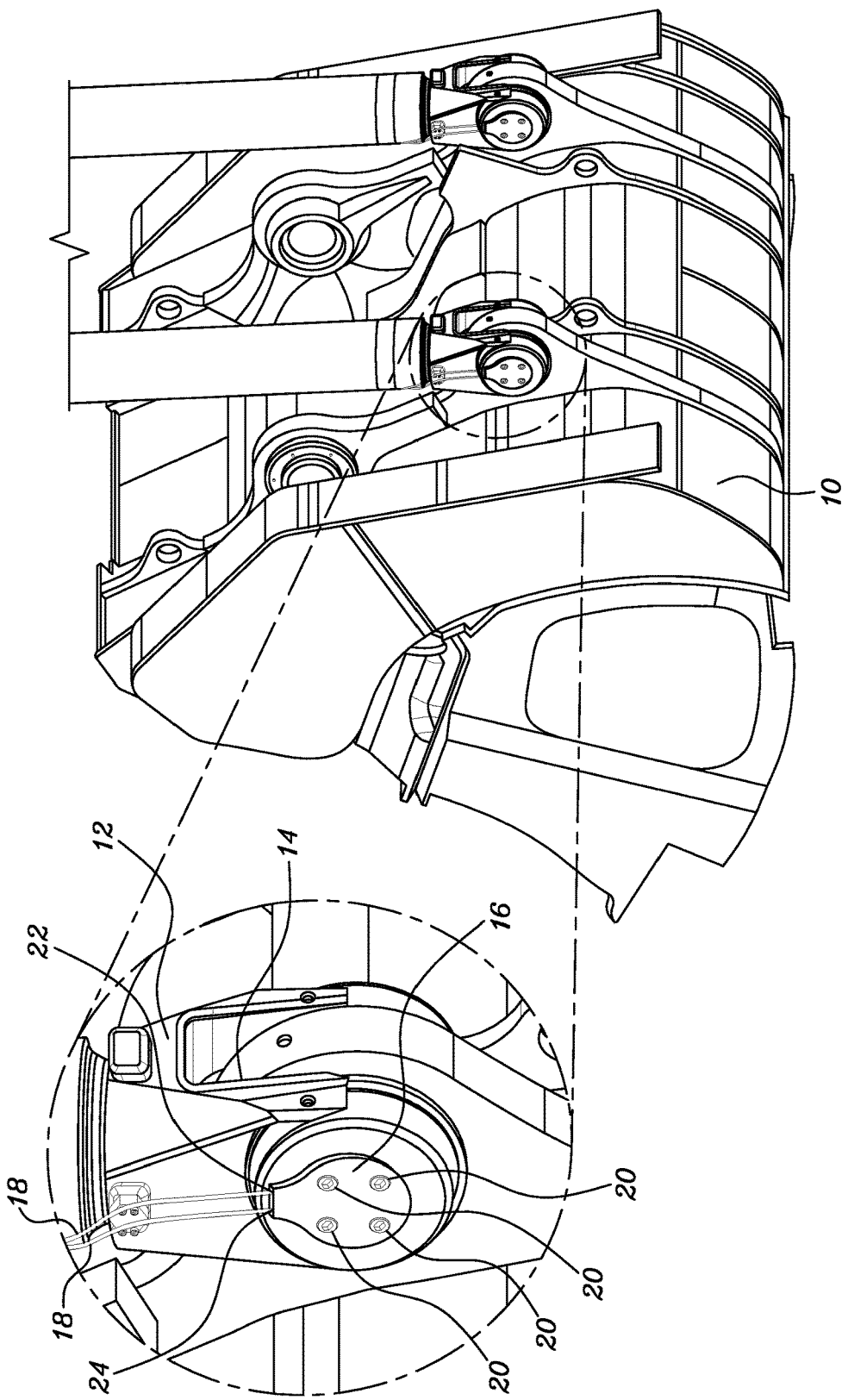
FIG. 1 is a perspective view of an excavator bucket having a cylinder clevis and a pivot joint along with a detailed view of the pivot joint, in accordance with the concepts of the present disclosure.

Referring to FIG. 1, an excavator bucket 10 having a cylinder clevis 12 and a pivot joint 14 is shown. The cylinder clevis 12 has a first cover plate 16 with lubricant lines 18, and a number of fasteners 20 coupling the first cover plate 16 with the cylinder clevis 12. The first cover plate 16 includes a first port 22 and a second port 24. The first port 22 and the second port 24 are connected to the lubricant lines 18. The lubricant lines 18 are utilized to supply a lubricant such as grease or lubricating oil, to the pivot joint 14. In order to provide the lubricant to the pivot joint 14, the lubricant lines 18 carry the lubricant from a lubricant supply (not shown) of a machine and feed the lubricant to the first port 22 and the second port 24, thereafter, the first port 22 and the second port 24 transfer the lubricant to the inside of the first cover plate 16 (described later in conjunction with FIGS. 2 and 3) and a second cover plate (described later in conjunction with FIGS. 4 and 5) for lubricating the pivot joint 14.

Figure 2:
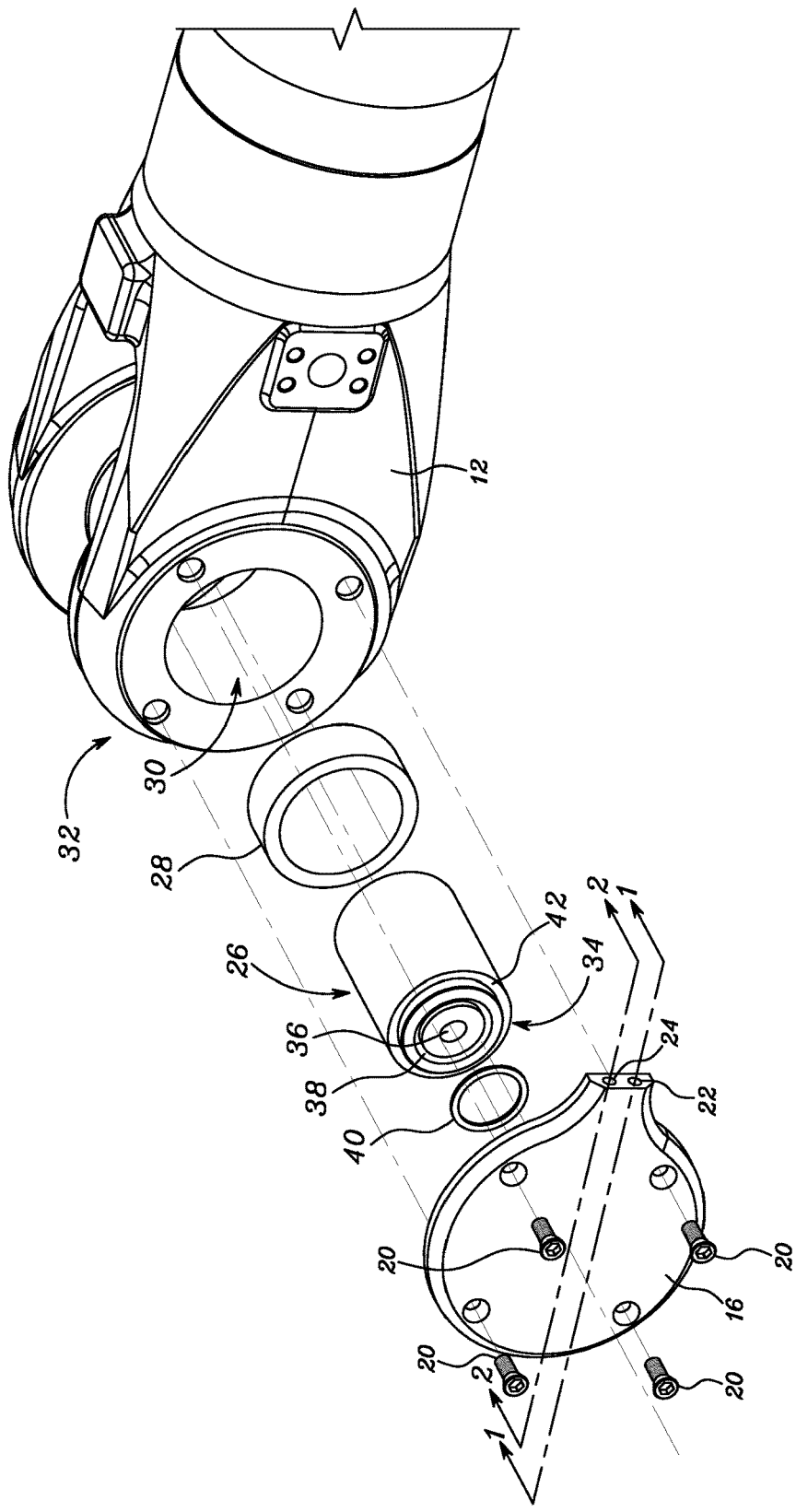
FIG. 2 is an exploded view of the pivot joint showing a first cover plate, a pin, and the cylinder clevis, in accordance with the concepts of the present disclosure.

Referring to FIG. 2, the cylinder clevis 12 has a first bushing 28 disposed in a first opening 30 at a first end 32 of the cylinder clevis 12. A pin 26 is coupled to the first bushing 28 at the first end 32 of the cylinder clevis 12. The pin 26 has a cylindrical structure. The pin 26 and the first bushing 28 are disposed coaxially within the cylinder clevis 12. Further, referring to FIGS. 2 and 3, the pin 26 has a first side 34, a second side 46 (shown in FIG. 3), and a bore 36 extending along a length of the pin 26 from the first side 34 to the second side 46 (shown in FIG. 3) through the pin 26. The first side 34 includes a first groove 38, provided for mounting a seal 40, and a second groove 42 in fluid communication with the first bushing 28, provided for transmission of the lubricant to the first bushing 28.

Figure 3:
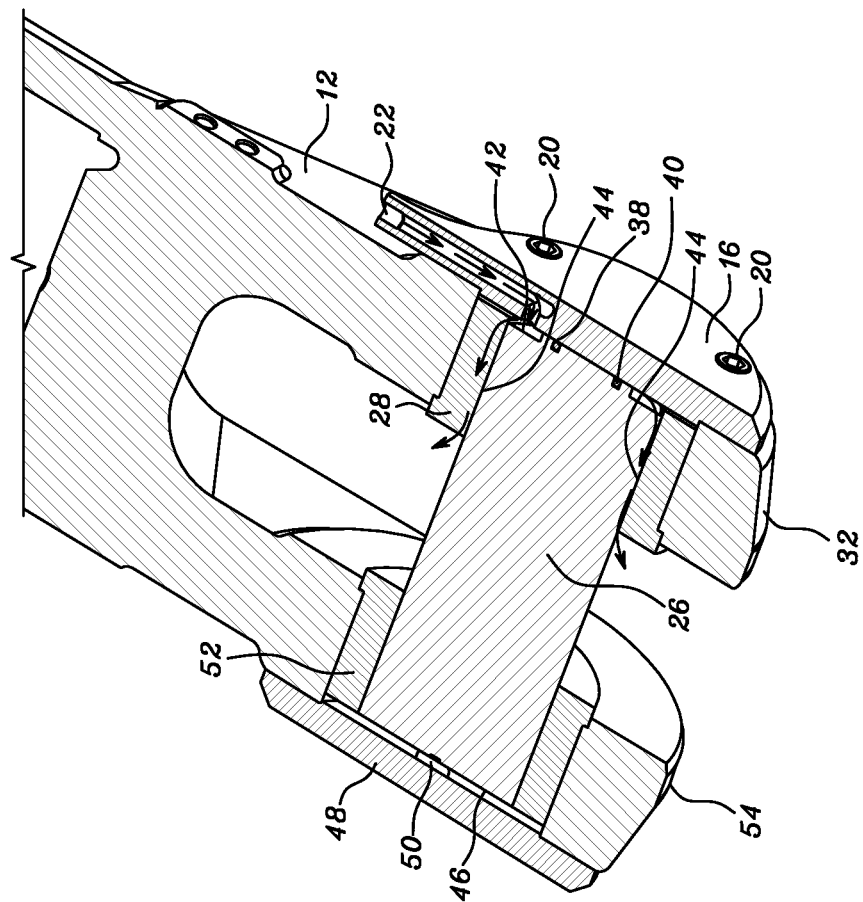
FIG. 3 is a sectional view of the pivot joint of the cylinder clevis, taken along 1-1 of FIG. 2, showing a lubricant being fed through a first port of the first cover plate, in accordance with the concepts of the present disclosure.

Referring to FIG. 3, the first bushing 28 needs lubrication at a first surface 44 touching the pin 26. In order to provide the lubrication, the corresponding one of the lubricant lines 18 that is connected to the first port 22 of the first cover plate 16 feeds the lubricant to the first port 22. The first port 22 is in fluid communication with the second groove 42. Therefore, the first port 22 transfers the lubricant from the lubricant lines 18 to the second groove 42. When the pin 26 and the first bushing 28 are fitted in the cylinder clevis 12, the second groove 42 and the first surface 44 form a circular channel for the lubricant to flow therethrough. The circular channel thus formed has the first surface 44 of the first bushing 28 on one side thereby, establishing a fluid communication between the second groove 42 and the first surface 44. Due to the fluid communication established, the second groove 42 transfers the lubricant to the first surface 44 of the first bushing 28, and thereby lubricating the first bushing 28. The lubricant flows across the entire first surface 44, and is finally flushed out of the first end 32 of the cylinder clevis 12. The seal 40 placed in the first groove 38 prevents the lubricant flowing through the second groove 42 from reaching the bore 36, thereby, directing the flow of lubricant from the first port 22 towards the first bushing 28.

Figure 4:
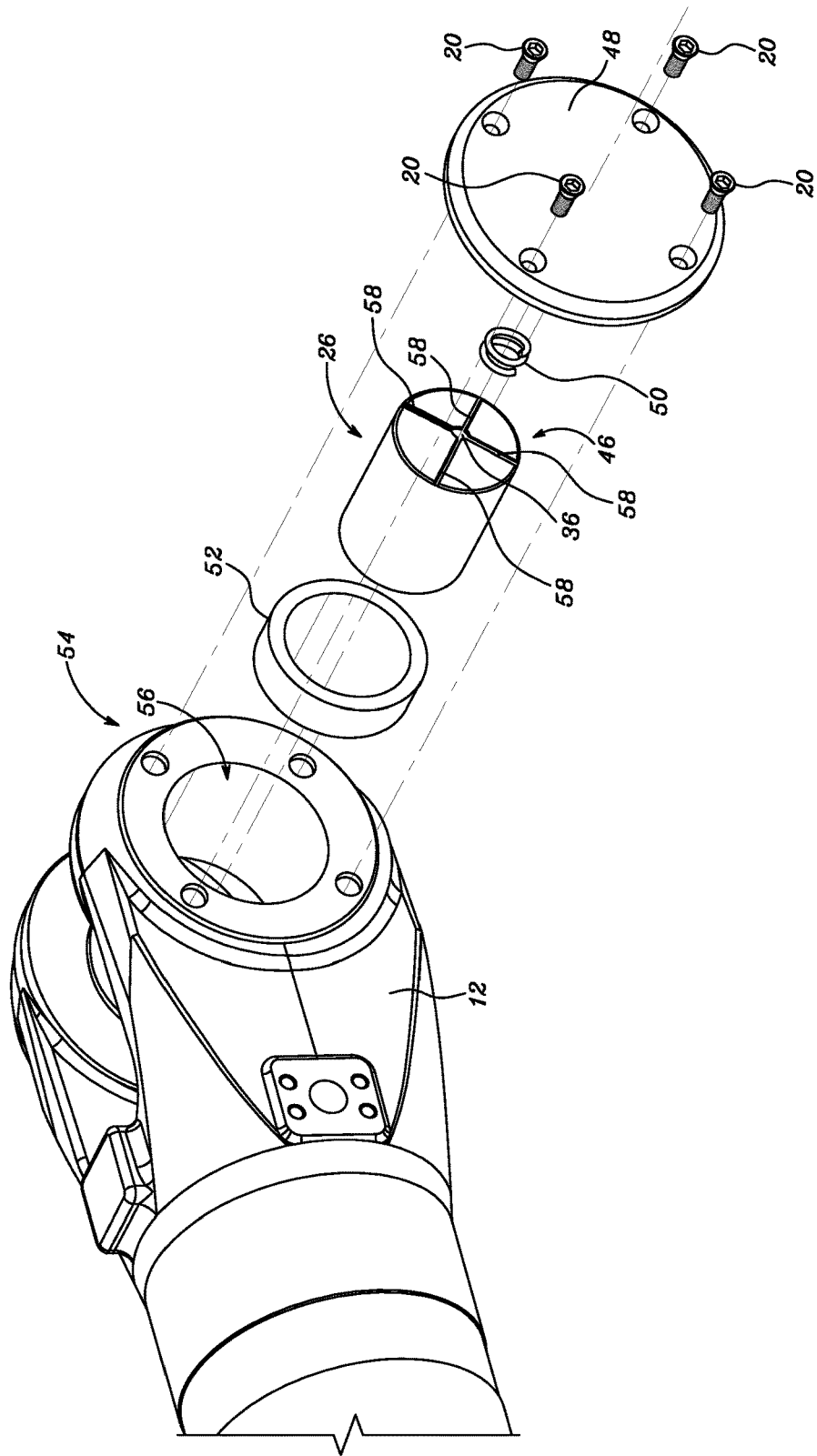
FIG. 4 is an exploded view of the pivot joint showing a second cover plate, the pin, and the cylinder clevis, in accordance with the concepts of the present disclosure.
Figure 5:
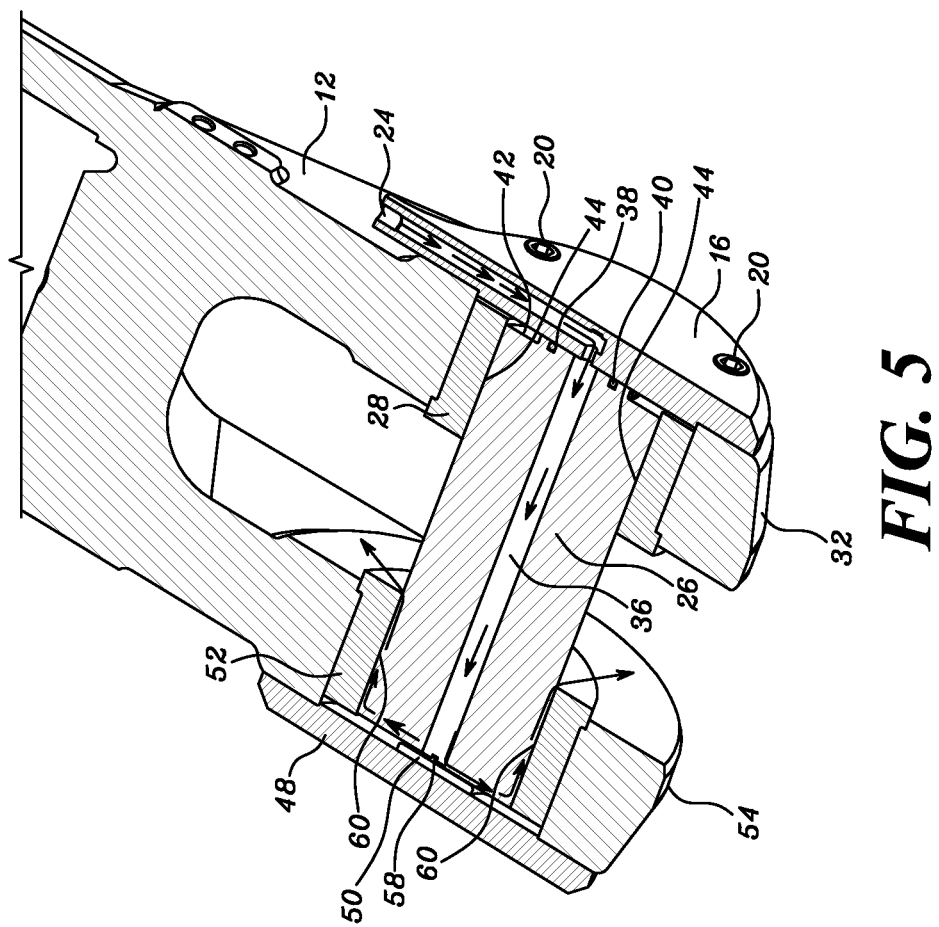
FIG. 5 is a sectional view of the pivot joint of the cylinder clevis, taken along 2-2 of FIG. 2, showing a lubricant being fed through a second port of the first cover plate in accordance with the concepts of the present disclosure.

Referring to FIGS. 4 and 5, the cylinder clevis 12, the pivot joint 14, the pin 26, a second cover plate 48, and a spring 50 are shown. The second cover plate 48 is connected to the cylinder clevis 12 using the fasteners 20. The cylinder clevis 12 has a second bushing 52 disposed in a second opening 56 at a second end 54 of the cylinder clevis 12. The pin 26 is coupled to the second bushing 52 at the second end 54 of the cylinder clevis 12. As explained earlier, the pin 26 has a cylindrical structure. The pin 26 and the second bushing 52 are disposed coaxially within the cylinder clevis 12. Further, the pin 26 has the second side 46, and the bore 36 that extends along the length of the pin 26 from the first side 34 to the second side 46 through the pin 26. The second side 46 includes a number of third grooves 58 (shown in FIG. 4) in fluid communication with the second bushing 52 and the bore 36, and the third grooves 58 are provided for transmission of the lubricant to the second bushing 52.

Referring to FIG. 5, the second bushing 52 needs lubrication at a second surface 60 touching the pin 26. In order to provide the lubrication, the corresponding one of the lubricant lines 18 that is connected to the second port 24 of the first cover plate 16 feeds the lubricant to the second port 24. The second port 24 is in fluid communication with the bore 36, the third grooves 58, and the second bushing 52. Therefore, the second port 24 transfers the lubricant from the lubricant lines 18 to the bore 36. The bore 36 being in fluid communication with the third grooves 58, transfers the lubricant to the third grooves 58. The third grooves 58 further transfer the lubricant to the second surface 60 of the second bushing 52, thereby lubricating the second bushing 52. The lubricant flows across the entire second surface 60 of the second bushing 52, and is finally flushed out of the second end 54 of the cylinder clevis 12. The seal 40 placed in the first groove 38 prevents the lubricant flowing through the second port 24 to reach the second groove 42, thereby, directing the flow of lubricant from the second port 24 towards the bore 36. Further, the spring 50 is placed between the second cover plate 48 and the second side 46 of the pin 26. The spring 50 applies a force on the second side 46 of the pin 26 and, thus, enables a closer contact between the seal 40 and the first cover plate 16.

In the present disclosure, each of the first cover plate 16 and the second cover plate 48 is equipped with a press fit mechanism enabling the first cover plate 16 and the second cover plate 48 to be press-fitted to the cylinder clevis 12. Further, the fasteners 20 for fastening the first cover plate 16 and the second cover plate 48 to the cylinder clevis 12 have countersunk heads.

It will be apparent to one skilled in art that although the FIG. 4 shows four third grooves 58, the pin 26 may include more than four third grooves 58 or less than four third grooves 58. Further, the third grooves 58 are shown as arranged at an angle of 90 degrees with each other in FIG. 4, the third grooves 58 may be arranged in any other fashion without departing from the scope of the present disclosure. Further, the lubrication of the pivot joint 14 in the excavator bucket 10 described above is provided only for illustration purposes. The pivot joint 14 may be provided on a tool other than the excavator bucket 10, such as, but not limited to a blade of a wheel tractor-scraper, a blade of a track type tractor etc., without departing from the scope of the present disclosure. Also, lubrication of any other pivot joints in a machine such as, but not limited to, a pivot joint of an arm, a pivot joint of a boom etc. is possible without departing from the scope of the present disclosure.

INDUSTRIAL APPLICABILITY

Heavy machines have pivot joints between various components of the machine. Typically, these pivot joints are lubricated with a lubricant such as grease or oil, using a number of lubricant lines. These lubricant lines are externally connected through ports to a cylinder clevis. As these lubricant lines are external and, therefore, are vulnerable to collisions, for example, with excavated material while the machine is operating. The damage in the lubricant lines leads to a failure of the pivotal joint, which causes unnecessary downtime of the machines. Moreover, such damage to the lubricant lines is difficult to spot immediately after it occurs, and thereby results in the failure of the pivotal joints.

The present disclosure provides the system for lubricating the pivot joint 14 of the cylinder clevis 12. The system provides for a more compact arrangement of the lubricant lines 18 which is less susceptible to the collision with the excavated material during operation, thereby preventing a failure of the pivot joint 14. Further, the first cover plate 16 and the second cover plate 48 are fastened with the fasteners 20 having countersunk heads further reducing a likelihood of leakage of lubricant due to damage in the fasteners 20. The first cover plate 16 and the second cover plate 48 are also equipped with a press fit mechanism enabling the first cover plate 16 and the second cover plate 48 to be press-fitted to the cylinder clevis 12 in order to prevent leakage of the lubricant and to transfer forces generated due to the collisions with the excavated boulders to the cylinder clevis 12 during the excavation operations.

The system further discloses the pin 26 having the second groove 42. The second groove 42 is connected to the first port 22 and receives lubricant from the first port 22. The second groove 42 is designed in form of a circular channel enabling a uniform distribution of the lubricant across the first surface 44 of the first bushing 28. Similarly, the lubricant flowing through the second port 24 flows through the bore 36. The bore 36 being in fluid communication with the third grooves 58 on the second side 46 of the pin 26, transfers the lubricant to the third grooves 58. The third grooves 58 are arranged at a 90 degree angle with respect to each other enabling a uniform distribution of the lubricant across the second surface 60 of the second bushing 52. The third grooves 58 further transfer the lubricant to the second surface 60 of the second bushing 52, thereby lubricating the second bushing 52. Further, the system provides the spring 50 between the second cover plate 48 and the second side 46 of the pin 26, which applies a spring force on the pin 26 and improves the sealing action of the seal 40, thereby enabling a uniform distribution of the lubricant across the first bushing 28 and the second bushing 52.

While aspects of the present disclosure have been particularly shown and described with reference to the embodiments above, it will be understood by one skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for lubricating a pivot joint of a cylinder clevis, the system comprising:
   a first bushing disposed in a first opening at a first end of the cylinder clevis;
   a second bushing disposed in a second opening at a second end of the cylinder clevis;
   a pin coupled to the first bushing at the first end and the second bushing at the second end, each of the first bushing, the second bushing, and the pin disposed coaxially within the cylinder clevis, the pin having:
   a first side having:
      a first groove provided for mounting a seal; and
      a second groove in fluid communication with the first bushing, and provided for transmission of a lubricant;
   a second side having at least one third groove in fluid communication with the second bushing, the at least one third groove provided for transmission of the lubricant; and
   a bore extending along a length of the pin from the first side to the second side through the pin, the bore being in fluid communication with the at least one third groove;
   a first cover plate and a second cover plate, connected to the cylinder clevis through a plurality of fasteners, wherein the first cover plate having:
      a first port in fluid communication with the second groove and the first bushing, the first port provided to transfer the lubricant to the first bushing through the second groove; and
      a second port in fluid communication with the bore, the at least one third groove, and the second bushing, the second port provided to transfer the lubricant to the second bushing through the bore and the at least one third groove; and
   a spring placed between the second cover plate and the second side of the pin, wherein the spring enabling a contact between the seal and the first cover plate.

* * * * *